(12) United States Patent
Burr et al.

(10) Patent No.: US 7,684,167 B2
(45) Date of Patent: Mar. 23, 2010

(54) COMMUNICATION BUS SUITABLE FOR USE IN A HAZARDOUS AREA OF A PROCESS PLANT

(75) Inventors: Kent A. Burr, Round Rock, TX (US); Gary K. Law, Georgetown, TX (US); Tom Aneweer, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 99 days.

(21) Appl. No.: 10/675,446

(22) Filed: Sep. 30, 2003

(65) Prior Publication Data
US 2005/0068710 A1   Mar. 31, 2005

(51) Int. Cl.
*H02H 1/00* (2006.01)
(52) U.S. Cl. ...................................... 361/119
(58) Field of Classification Search ................... 361/119
See application file for complete search history.

(56) References Cited

U.S. PATENT DOCUMENTS

| | | | |
|---|---|---|---|
| 3,968,407 A | 7/1976 | Wilson | |
| 4,037,905 A | 7/1977 | Lucas | |
| 4,420,840 A | 12/1983 | Livermore | |
| 5,144,517 A | 9/1992 | Wieth | |
| 5,168,237 A | 12/1992 | Fieau et al. | |
| 5,400,203 A | 3/1995 | Tice | |
| 5,448,231 A | 9/1995 | Takezoe et al. | |
| 5,631,795 A | 5/1997 | Koyama | |
| 5,784,547 A | 7/1998 | Dittmar et al. | |
| 5,835,534 A | 11/1998 | Kogure | |
| 6,037,857 A | 3/2000 | Behrens et al. | |
| 6,111,738 A | 8/2000 | McGoogan | |

(Continued)

FOREIGN PATENT DOCUMENTS

CN      1444151      9/2003

(Continued)

OTHER PUBLICATIONS

Axxon, "Intrinsic Safety Overview," available at http://grouper.ieee.org/groups/1451/5/other%20Documents/Intrinsic%20Safety%20Brief.pdf, on Jan. 6, 2004.

(Continued)

*Primary Examiner*—Stephen W Jackson
*Assistant Examiner*—Ann T Hoang
(74) *Attorney, Agent, or Firm*—Marshall, Gerstein & Borun LLP (57) ABSTRACT

A communication bus suitable for use in a hazardous area of a process plant includes a first transmission path adapted to communicate electrical signals in a first direction, and a second transmission path adapted to communicate electrical signals in a second direction. A safety device is coupled to each of the first and second transmission paths and includes a control unit adapted to detect a fault condition associated with the communication bus. The safety device further includes a switch unit adapted to interrupt the flow of electrical signals along each of the first and second transmission paths in response to the detected fault condition. In this manner, the detection circuitry of the communication bus automatically reduces or prevents the occurrence of sparks or arcing in the event of a fault condition associated with the communication bus.

40 Claims, 4 Drawing Sheets

U.S. PATENT DOCUMENTS

| | | | |
|---|---|---|---|
| 6,115,831 | A | 9/2000 | Hanf et al. |
| 6,366,434 | B2 | 4/2002 | Magnussen |
| 6,370,448 | B1 * | 4/2002 | Eryurek .................. 700/282 |
| 6,385,166 | B1 * | 5/2002 | Takagi et al. ............ 370/222 |
| 6,510,353 | B1 | 1/2003 | Gudaz et al. |
| 6,525,915 | B1 | 2/2003 | Graube |
| 6,582,248 | B2 | 6/2003 | Bachman |
| 6,594,603 | B1 * | 7/2003 | Eryurek et al. ............ 702/104 |
| 6,898,468 | B2 * | 5/2005 | Ott et al. .................. 700/21 |
| 6,912,671 | B2 * | 6/2005 | Christensen et al. ........ 714/25 |
| 2002/0015273 | A1 | 2/2002 | Lytollis |
| 2002/0064011 | A1 | 5/2002 | Loechner |
| 2002/0194547 | A1 | 12/2002 | Christensen et al. |
| 2003/0011250 | A1 | 1/2003 | Pullmann et al. |
| 2003/0172318 | A1 | 9/2003 | Sugita et al. |

FOREIGN PATENT DOCUMENTS

| | | |
|---|---|---|
| EP | 0 883 044 | 12/1998 |
| GB | 1 250 766 | 10/1971 |

OTHER PUBLICATIONS

Morris, "Intrinsic safety protects your plant against explosions," available at http://www.manufacturing.net/ctl/index.asp?layout=articlePrint&articleID=CA188222 on Nov. 11, 2003.

"Intrinsic Safety," available at http://www.mtl-inst.com/mtl.nsf/pages/Intrinsic_Safety?OpenDocument on Nov. 11, 2003.

Merritt, "U.S. Embraces Intrinsic Safety, Acceptance is Being Driven by Agency Acceptance, Global Area Classifications, and Availability of Domestic Expertise," available at http://www.controlmagazine.com/Web_First/CT.nsf/0/862568C9006E91CB86256A49007 . . . on Nov. 11, 2003.

B&B Electronics, "Current Loop Application Note," Jan. 1995.

Omega Engineering, "Intrinsic Safety," available at http://www.omega.com/techref/instrinsic.html on Nov. 11, 2003.

Emerson Process Management, "Whitepaper—Buses and the DeltaV System," Jan. 2002.

Emerson Process Management, "Whitepaper—Installing Multiple Intrinsically Safe Fieldbus Devices with the DeltaV System," Jan. 2002.

Emerson Process Management, "Whitepaper—A Primer on Electrical Equipment in Potentially Explosive Atmospheres," Jan. 2002.

Rezabek, "Controlling Processes via Fieldbus—Increasing reliability and reducing costs," *Chemical Processing*, Aug. 2001.

Vähämäki, "Arc protection as integrated part of line protection relays," available at http://www.esi.co.za/last/esi_3_2003/033_40.htm on Jan. 6, 2004.

Search Report under Section 17(5) issued in GB0418222.6 application by the United Kingdom Patent Office on Nov. 15, 2004.

English-language translation of Second Office Action for Chinese Application No. 2004100832536, issued on Apr. 10, 2009.

* cited by examiner

COMMUNICATION BUS SUITABLE FOR USE IN A HAZARDOUS AREA OF A PROCESS PLANT

TECHNICAL FIELD

The present disclosure relates generally to a process plant and, more particularly, to a communication bus suitable for use in a hazardous area of a process plant.

DESCRIPTION OF THE RELATED ART

In process plants where flammable or combustible materials are present, potentially dangerous conditions exist due to the possibility that the flammable atmosphere may ignite. These conditions may occur in many industrial environments such as, for example, environments involving petroleum and other chemicals, flammable gases, combustible dusts, explosive vapors, etc. Standardized classifications for the various types of hazardous locations have been adopted and assigned by regulatory agencies and organizations according to the nature and type of hazard that is generally present or that may occasionally be present. To protect both plant personnel and property, precautions should be taken inside these hazardous areas to avoid the risk of electrical sparks or excessive heat that may ignite the surrounding atmosphere.

Protection concepts for process measurement and control in hazardous areas are generally known as explosion protection techniques. An electrical device may be constructed to be intrinsically safe, which is a popular explosion protection technique. An intrinsically safe device is designed so that the electrical energy used and/or generated by the device does not exceed predetermined energy limit values at any time, so that, in the event of a fault, the maximum amount of energy released by the intrinsically safe device is not sufficient to produce a spark capable of causing ignition. In addition, the temperature of the device is limited so that the device is unable to cause spontaneous ignition. In other words, an intrinsically safe device is a device that cannot cause a spark or achieve a temperature sufficient to ignite the surrounding hazardous atmosphere during normal operation as well as operation during any fault condition. A number of agencies certify that the power dissipation levels, energy storage capabilities, operating temperature, voltage and current requirements, etc. of such devices are in accordance with special safety regulations, which are defined in intrinsic safety standards.

If an electrical device is not intrinsically safe, other methods exist to ensure that the device does not serve as a source of ignition. Typically, where a device is not intrinsically safe, it may be made safe by housing the entire device (or a portion of the device) in an explosion-proof enclosure. An explosion-proof enclosure is one that will prevent any explosion that might occur inside the enclosure from causing the atmosphere outside the enclosure to ignite.

Alternatively, the electrical device may be enclosed in some other type of protective enclosure and purged or pressurized with compressed air or an inert gas to prevent the external, explosive atmosphere from entering the enclosure. As a result, a spark or elevated temperature of the component within the purged enclosure does not ignite the hazardous external atmosphere.

Typically, busses connect equipment located in a non-hazardous area of the process plant (e.g., a control room) to equipment located in an area in which there is a danger of explosion (i.e., a hazardous area). Presently, energy-limiting or intrinsic safety barriers (e.g., Zener barriers) may be inserted at an interface between the non-hazardous and hazardous areas. The energy-limiting barriers limit the electrical energy that passes into the hazardous area to safe levels that are unable to cause an ignition. As a result, excess energy from possible faults occurring in the non-hazardous area may not be passed along the bus to cause a spark inside the explosive or otherwise hazardous area of the process plant. Unfortunately, electrically limiting the energy may result in distortion of the communication signals being carried by the bus. Moreover, energy-limiting barriers are often difficult and costly to install and maintain.

Even if equipment is not located in a hazardous area, the interconnecting cable or bus may still have to pass through the hazardous area. Although the energy in digital signals is small, this small amount of energy is sometimes sufficient to produce an explosion-igniting arc or spark if allowed to escape to the hazardous atmosphere when, for example, the bus becomes cut, severed, opened, and/or disconnected. Therefore, explosion protection techniques related to the bus wiring are of extreme importance because of the inherent danger of damage to the wires of the bus or other fault condition associated with the bus wiring (e.g., an open circuit), resulting in the release of an explosion-igniting spark or arc in the hazardous area.

SUMMARY OF THE DISCLOSURE

A communication bus that is suitable for use in a hazardous area of a process plant includes a first transmission path that is adapted to communicate electrical signals in a first direction, and a second transmission path that is adapted to communicate electrical signals in a second direction. A safety device coupled to each of the first and second transmission paths includes a control unit adapted to detect a fault condition associated with the communication bus. The safety device further includes a switch unit adapted to interrupt the flow of electrical signals along each of the first and second transmission paths in response to the detected fault condition.

The safety device provides a reliable and inexpensive mechanism for safely interrupting the flow of electrical signals along a communication bus located in a hazardous area upon the detection of a fault condition associated with the communication bus. The safety device eliminates or reduces the need for expensive energy-limiting barriers on the communication bus, which are often difficult to install and maintain. In addition, by bidirectionally interrupting the flow of electrical signals along each of the first and second transmission paths upon the detection of a fault condition associated with the communication bus, the safety device reduces the possibility of the occurrence of a spark or arc that could ignite a flammable atmosphere in a hazardous area.

DETAILED DESCRIPTION

Figure 1:
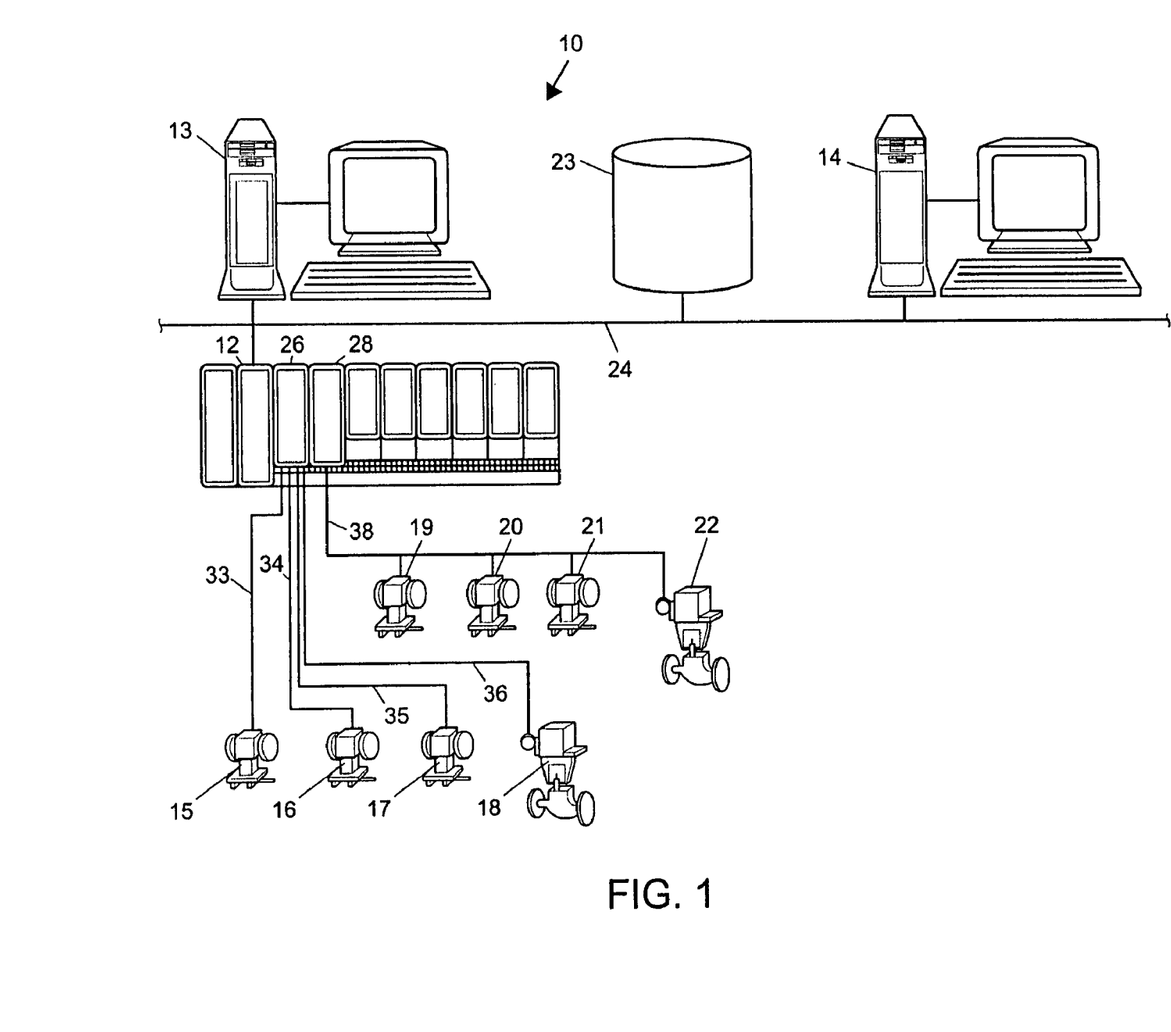
FIG. 1 is an exemplary block diagram of a typical process plant including a communication bus that connects one or more operator workstations and a data historian to a process controller and a plurality of field devices.

Referring now to FIG. 1, a process plant 10 includes a plurality of field devices 15-22 connected to a process controller 12 via one or more input/output (I/O) devices 26, 28. The process controller 12 may be a distributed control system (DCS) type controller such as, for example, a DeltaV™ controller sold by Emerson Process Management, or any other type of controller for use in controlling field devices 15-22 in any conventional or any other desired manner. The process controller 12 is capable of implementing a process control routine stored therein and/or capable of communicating with control elements such as function blocks located within, for example, smart field devices 19-22 distributed throughout the process plant 10.

The process controller 12 is communicatively coupled to one or more operator workstations 13, 14 via a communication bus 24. The communication bus 24 may use any desired or suitable local area network (LAN) or wide area network (WAN) protocol to provide communications. Preferably, the communication bus 24 is an Ethernet-based bus including twisted pair cables. In this case, the communication bus 24 includes eight separate wires bundled as four twisted pairs, with two of the pairs of the cable being used to provide process control communications. The remaining two twisted pairs of cable often are unused. Of course, the communication bus 24 may include any other suitable hardwired link such as, for example, coaxial cable, a hybrid of twisted pair cable and coaxial cable, etc.

The operator workstations 13, 14 may be based on a personal computer platform or any other suitable processing platform, and may perform a variety of known process control, maintenance, and other functions. In addition, the process plant 10 may include a data historian 23 that collects process information from the process controller 12 and the plurality of field devices 15-22 via the communication bus 24. It should be understood that the process plant 10 shown in FIG. 1 is merely exemplary in nature, and other types or configurations of process plants 10 can be used as well.

The plurality of field devices 15-22 may include devices such as, for example, sensors, valves, transmitters, positioners, etc. Similarly, the I/O devices 26, 28 may be any types of I/O devices conforming to any desired communication or controller protocol. As shown in FIG. 1, the process controller 12 is communicatively coupled to conventional (i.e., non-smart) field devices 15-18 via analog lines 33-36. The conventional field devices 15-18 may be standard 4-20 mA analog field devices that communicate over the analog lines 33-36 to the I/O device 26.

Alternatively, or in addition, the plurality of field devices 15-22 may include smart field devices 19-22 that communicate over a digital bus 38 to the I/O device 28 using FOUNDATION™ Fieldbus (hereinafter "Fieldbus") protocol communications. Generally, the Fieldbus protocol is an all-digital, serial, two-way communication protocol that provides a standardized physical interface to a two-wire loop or bus that interconnects smart field devices 19-22 located in an instrumentation or process control environment of, for example, a factory or a plant. The Fieldbus protocol provides, in effect, a local area network for smart field devices 19-22 within the process plant 10 that enables these smart field devices 19-22 to execute one or more process control loops either in conjunction with or independently from the process controller 12.

While the process plant 10 uses the Fieldbus communication protocol to provide communications for the smart field devices 19-22, it could use a number of standard, open, digital or combined digital and analog communication protocols such as the HART®, PROFIBUS®, WORLDFIP®, DeviceNet®, AS-Interface, and CAN protocols as well.

Figure 2:
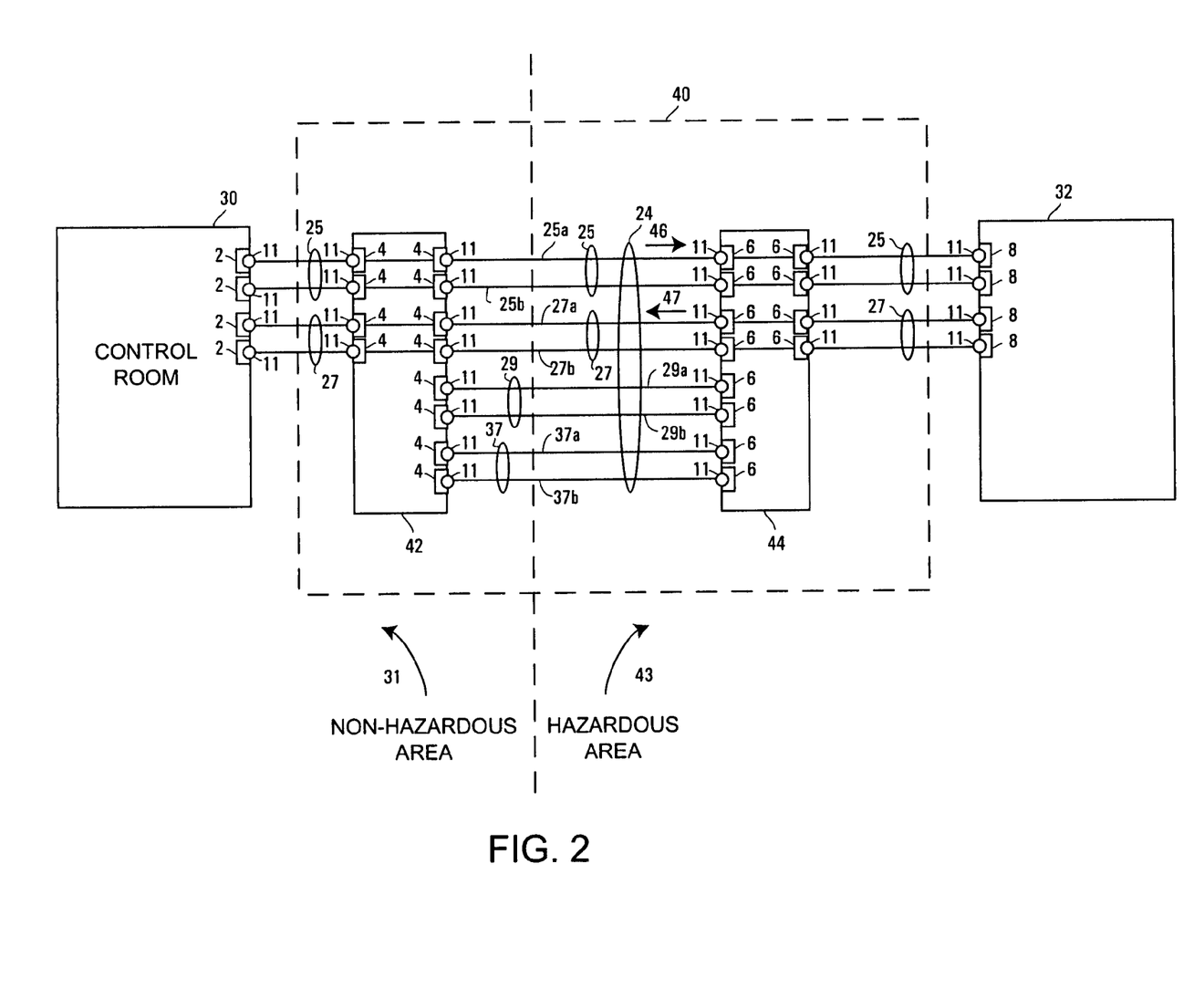
FIG. 2 is an exemplary block diagram of the communication bus including a safety device adapted to interrupt the flow of electrical signals in the hazardous area upon the detection of a fault condition associated with the communication bus.

FIG. 2 illustrates one embodiment of a communication bus 24 suitable for use in a hazardous area 43 of the process plant 10. As discussed above, the communication bus 24 may be an eight-wire bus, organized into four wire pairs. Specifically, a first wire pair 25 includes a first transmission line 25a and a second transmission line 25b. A second wire pair 27 includes a third transmission line 27a and a fourth transmission line 27b. A third wire pair 29 includes a fifth transmission line 29a and a sixth transmission line 29b. And a fourth wire pair 37 includes a seventh transmission line 37a and an eighth transmission line 37b.

As illustrated in FIG. 2, each of the first, second, third, and fourth wire pairs 25, 27, 29, 37 includes associated male-type connectors 11 attached at ends of the respective transmission lines 25a,b, 27a,b, 29a,b, 37a,b. Preferably, each of the male-type connectors 11 is an RJ-45 Ethernet cable connector. However, it should be understood that other types of connectors such as, for example, ISDN/LAN connectors, and other types of Ethernet connectors besides RJ-45 connectors may be used if desired.

The first and second wire pairs 25, 27 communicate signals from the operator workstations 13, 14 and/or the data historian 23 to the process controller 12 and the plurality of field devices 15-22. For example, the process controller 12 and/or one or more of the plurality of field devices 15-22 may receive commands from the operator workstations 13, 14 via the first and second wire pairs 25, 27. If desired, the first and second wire pairs 25, 27 may also be adapted to communicate power from a power supply (not shown) to the process controller 12 and the plurality of field devices 15-22. In other words, the plurality of field devices 15-22 and the process controller 12 may be powered over the same pairs of wires 25, 27 that provide communications.

Furthermore, the smart field devices 19-22 and the process controller 12 may communicate signals to the operator workstations 13, 14 and/or the data historian 23 via the first and second wire pairs 25, 27 of the communication bus 24. For example, the process controller 12 and/or one or more of the smart field devices 19-22 may communicate alarm, status, and diagnostic information to the operator workstations 13, 14 and/or the data historian 23 via the first and second wire pairs 25, 27. Still further, the first and second wire pairs 25, 27 may communicate signals from the process controller 12 to the plurality of field devices 15-22.

The first wire pair 25 is adapted to communicate electrical signals in a first direction, indicated by arrow 46, while the second wire pair 27 is adapted to communicate electrical signals in a second direction, indicated by arrow 47. As such, electrical signals may flow in either the first direction or the second direction simultaneously. Typically, the third and fourth wire pairs 29, 37 of the twisted pair cable are unused. Therefore, electrical signals typically do not flow along the third and fourth wire pairs 29, 37.

In some process plants 10, it is common for one or more of the plurality of field devices 15-22 and/or the process controller 12 to be located in a highly combustible hazardous area 43. For example, in a chemical processing plant, a field device may measure and/or control the level of fluid in a storage tank containing highly flammable liquid. As such, it may be necessary to communicate electrical signals into or out of the hazardous area 43 for measurement and/or control purposes. To reduce the risk of electrical sparks, arcing, and/or excessive heat caused by fault conditions of the communication bus 24 (e.g., a disconnected, opened, cut, severed, and/or otherwise damaged communication bus 24), precautions should be taken to reduce the possibility of the communication bus 24 serving as a source of ignition.

As illustrated in FIG. 2, the operator workstations 13, 14 and/or power supply (not shown) is typically located in a control room 30 in a non-hazardous area 31 that is free of any flammable materials. The operator workstations 13, 14 and/or the power supply (not shown) located in the control room 30 includes female-type connectors 2, for example, RJ-45 connectors, configured to receive the male-type connectors 11 associated with the first and second wire pairs 25, 27 of the communication bus 24. The first and second wire pairs 25, 27 may extend from the control room 30 located in the non-hazardous area 31 to a device 32 located in the hazardous area 43. The device 32 such as, for example, the process controller 12 and/or one or more of the plurality of field devices 15-22 similarly includes female-type connectors 8, for example, RJ-45 connectors, configured to receive the male-type connectors 11 associated with the first and second wire pairs 25, 27 of the communication bus 24.

To protect against inadvertent sparks, arcing, and/or excessive heat of the communication bus 24 when it is located in the hazardous area 43 under fault conditions (e.g., when the communication bus 24 becomes disconnected, severed, cut, etc.), a safety device 40, which includes a first switch assembly 42 and a second switch assembly 44, may be installed on the communication bus 24. Each of the first switch assembly 42 and the second switch assembly 44 may be housed in respective blocks (e.g., electrical connection blocks, junction blocks, switch blocks, relay blocks, etc.), which may be used to connect the electrical wires of the communication bus 24 together. If desired, the blocks may also provide terminations for the wires of the communication bus 24.

The first switch assembly 42 includes twelve female-type connectors 4, for example RJ-45 connectors, configured to receive and hold twelve corresponding male-type connectors 11 and their associated cables. Similarly, the second switch assembly 44 includes twelve female-type connectors 6, for example RJ-45 connectors, configured to receive and hold twelve corresponding male-type connectors 11 and their associated cables. Although the first switch assembly 42 and the second switch assembly 44 are illustrated as having twelve connectors each, it should be understood that each of the first switch assembly 42 and the second switch assembly 44 may include any desired number of female-type connectors.

To install the first switch assembly 42, male-type connectors 11 associated with the first, second, third, and fourth wire pairs 25, 27, 29, 37 are plugged into corresponding female-type connectors 4 located at a first side of the first switch assembly 42. To complete the installation of the first switch assembly 42, male-type connectors 11 associated with the first and second wire pairs 25, 27 are plugged into corresponding female-type connectors 4 located at a second side of the first switch assembly 42. Lastly, male-type connectors 11 associated with the first and second wire pairs 25, 27 are plugged into corresponding female-type connectors 2 associated with the control room 30.

Similarly, to install the second switch assembly 44, male-type connectors 11 associated with the first, second, third, and fourth wire pairs 25, 27, 29, 37 are plugged into corresponding female-type connectors 6 located at a first side of the second switch assembly 44. To complete the installation of the second switch assembly 44, male-type connectors 11 associated with the first and second wire pairs 25, 27 are plugged into corresponding female-type connectors 6 located at a second side of the second switch assembly 44. Lastly, male-type connectors 11 associated with the first and second wire pairs 25, 27 are plugged into corresponding female-type connectors 8 associated with the device 32. For example, one or more of the plurality of field devices 15-22 and/or the process controller 12 located in the hazardous area 43 may include female-type connectors 8 embedded therein.

Although the first switch assembly 42, the second switch assembly 44, the operator workstations 13, 14 and/or the power supply located in the control room 30 are described as having female-type connectors that receive male-type connectors associated with the first, second, third, and fourth wire pairs 25, 27, 29, 37, it should be understood that each of the first, second, third, and fourth wire pairs 25, 27, 29, 37 may include female-type connectors adapted to receive male-type connectors associated with the first switch assembly 42, the second switch assembly 44, the operator workstations 13, 14, and/or the power supply located in the control room 30.

As described in more detail below, each of the first and second switch assemblies 42, 44 of the safety device 40 includes components adapted to safely interrupt the flow of electrical signals in both the first and second wire pairs 25, 27 upon the detection of a fault condition associated with the communication bus 24 (e.g., the communication bus 24 becoming unplugged from the first switch assembly 42 and/or the second switch assembly 44).

Figure 3:
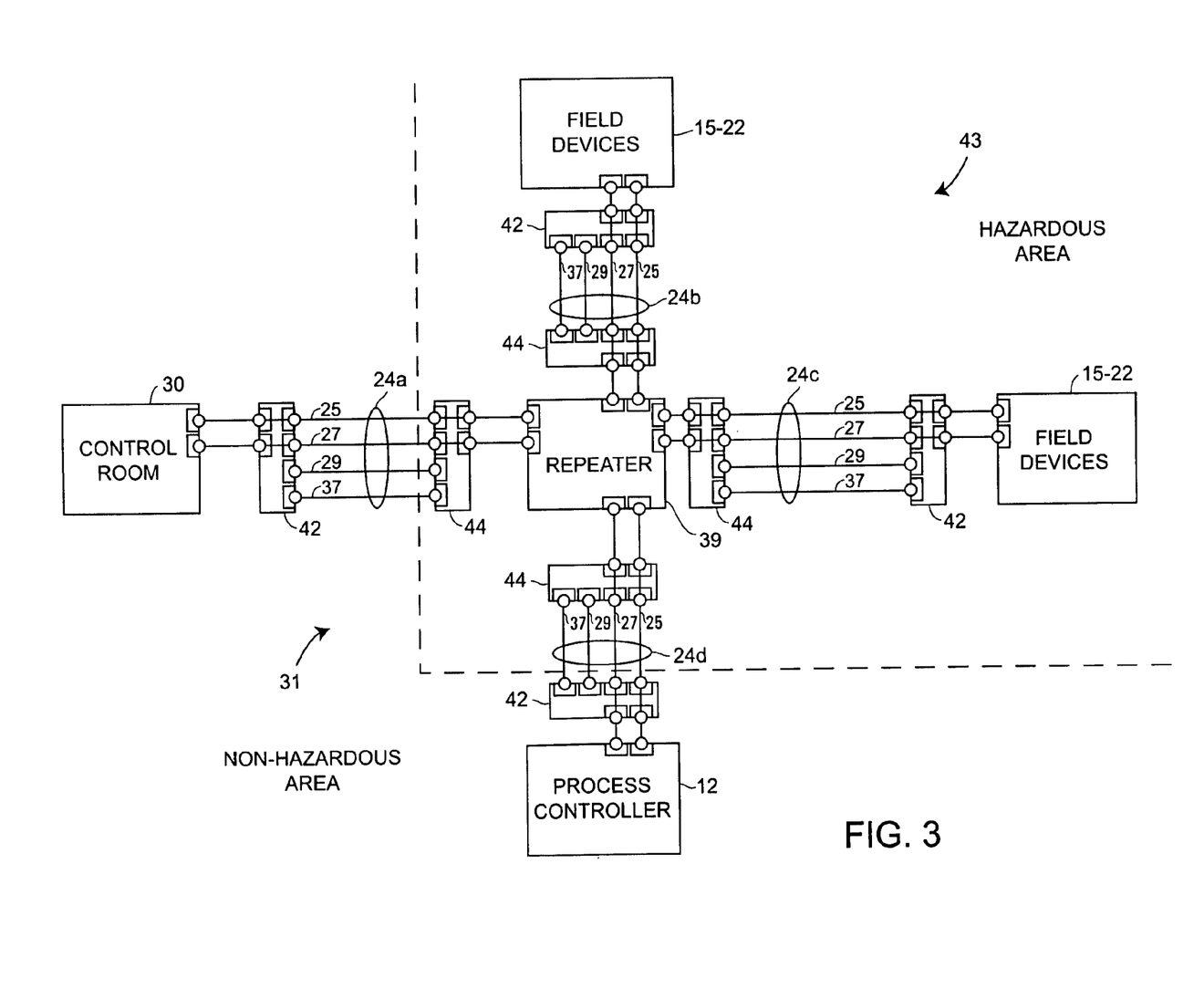
FIG. 3 is an exemplary block diagram of a process plant having multiple bus segments that are connected together via a repeater.

With reference to FIG. 3, the communication bus 24 may include a hub and/or repeater 39 that connects multiple bus sections or bus segments 24a-d together. A repeater 39 is often necessary to connect devices when the distance between the devices is too great to provide reliable communications. The repeater 39 may operate to boost the electrical signals communicated via the multiple bus segments 24a-d. In this manner, a fault condition associated with one bus segment does not necessarily affect the operation of the other bus segments. As a result, the entire process may not have to be shut down in the event of a fault condition associated with only one of the bus segments.

Electrical equipment intended for use in a hazardous area 43 should conform to safety standards set to reduce the possibility of an explosion. As a result, the repeater 39, the plurality of field devices 15-22, the process controller 12, and/or the I/O devices 26, 28 may be constructed to be intrinsically safe (or energy-limited) when located in the hazardous area 43. Alternatively or in addition, when located in the hazardous area 43, the repeater 39, the plurality of field devices 15-22, the process controller 12, the I/O devices 26, 28, and/or the first and second switch assemblies 42, 44 may be housed within one or more explosion-proof enclosures adapted to contain any explosion that might erupt inside the enclosure. Still further, when the repeater 39, the plurality of field devices 15-22, the process controller 12, the I/O devices 26, 28, and/or the first and second switch assemblies 42, 44 are located in the hazardous area 43, each of the devices may be housed within a purged enclosure adapted to isolate the explosive air from the air inside the enclosure.

Figure 4:
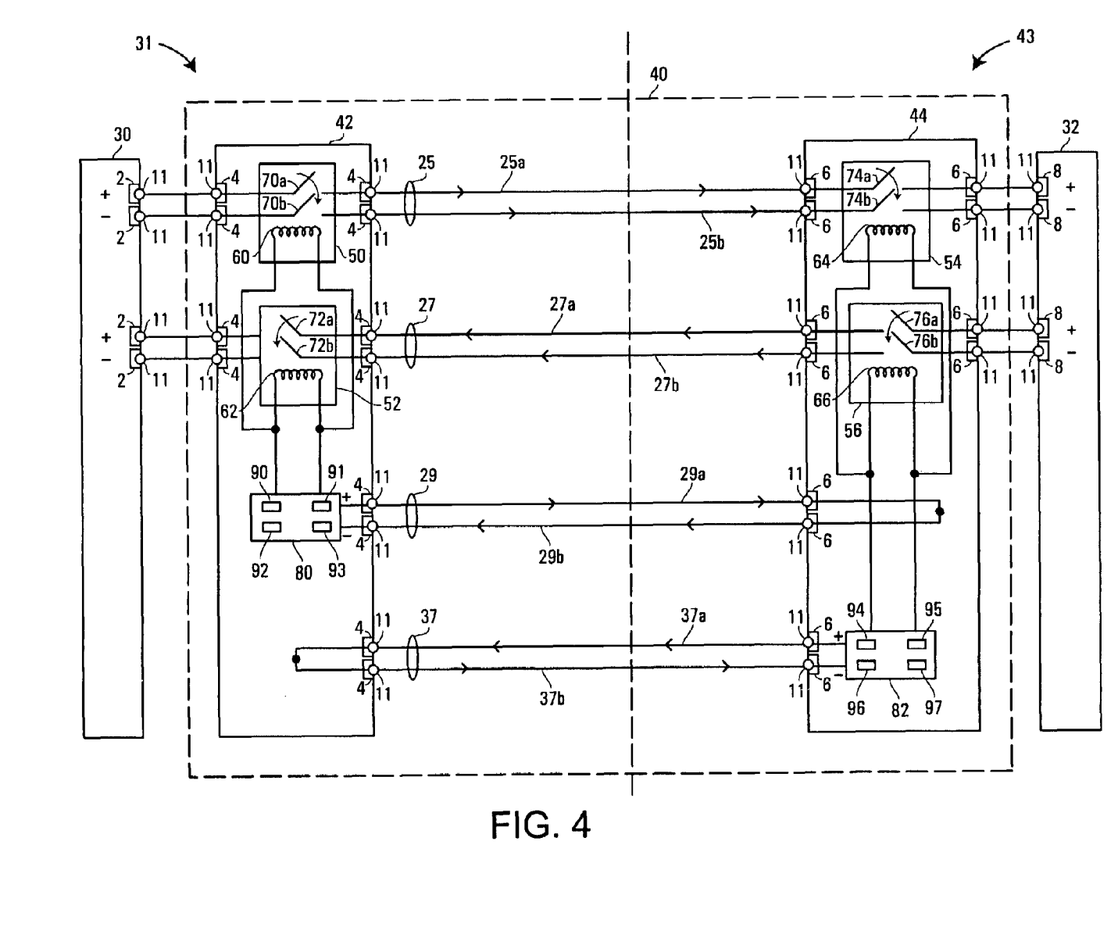
FIG. 4 is a more detailed block diagram of the safety device shown in FIG. 2.

Referring now to FIG. 4, the internal operation of the safety device 40 will be discussed. As illustrated, the first switch assembly 42 and the second switch assembly 44 of the safety device 40 are connected across each of the four wire pairs 25, 27, 29, 37. The first switch assembly 42 includes a first relay 50 and a second relay 52, both of which are controlled by a first control unit 80 coupled to the third wire pair 29. Similarly, the second switch assembly 44 includes a third relay 54 and a fourth relay 56, both of which are controlled by a second control unit 82 coupled to the fourth wire pair 37.

Although only two relays are provided in each of the first and second switch assemblies 42, 44, it should be understood that the number of relays provided in each of the first and second switch assemblies 42, 44 may be increased to provide redundant operation. In addition, although the first switch assembly 42 is shown located in the non-hazardous area 31, while the second switch assembly 44 is shown located in the hazardous area 43, the first and second switch assemblies 42, 44 may be located anywhere along the communication bus 24. For example, both the first and second switch assemblies 42, 44 may be located entirely within the hazardous area 43 of the process plant 10. Alternatively, both the first and second switch assemblies 42, 44 may be located entirely within the non-hazardous area 31 of the process plant 10. As discussed above, the first and second switch assemblies 42, 44 should comply with safety standards when they are located in the hazardous area 43. For example, the first and second switch assemblies 42, 44 may be housed within explosion-proof or purged enclosures when they are located in the hazardous area 43.

As illustrated in FIG. 4, the first relay 50 and the third relay 54 are coupled to the first wire pair 25, while the second relay 52 and the fourth relay 56 are coupled to the second wire pair 27. A first coil 60 controls a first set of contacts 70a, 70b, and a second coil 62 controls a second set of contacts 72a, 72b. Alternatively, each contact associated with the first set of contacts 70a, 70b and the second set of contacts 72a, 72b may be controlled individually by respective coils. Still further, one coil may control both the first set of contacts 70a, 70b and the second set of contacts 72a, 72b if desired.

Similarly, a third coil 64 controls a third set of contacts 74a, 74b, and a fourth coil 66 controls a fourth set of contacts 76a, 76b. However, each contact associated with the third set of contacts 74a, 74b and the fourth set of contacts 76a, 76b may be controlled individually by respective coils, or one coil may control both the third set of contacts 74a, 74b and the fourth set of contacts 76a, 76b if desired.

In the embodiment illustrated in FIG. 4, the first coil 60 is coupled in parallel with the second coil 62, and both the first and second coils 60, 62 are coupled to the first control unit 80. In this manner, the first set of contacts 70a, 70b and the second set of contacts 72a, 72b are substantially simultaneously controlled by the first control unit 80. Similarly, the third coil 64 is coupled in parallel with the fourth coil 66, and both the third and fourth coils 64, 66 are coupled to the second control unit 82. In this manner, the third set of contacts 74a, 74b and the fourth set of contacts 76a, 76b are substantially simultaneously controlled by the second control unit 82.

Preferably, the first, second, third, and fourth sets of contacts 70a,b-76a,b are normally-open (NO) contacts. A NO contact is a two-state switch having an unenergized normal state in which the contact is open. When current passes through the coils 60-66, the respective relays 50-56 change contact states. Therefore, when the coils 60-66 are energized, the corresponding NO contact sets 70a,b-76a,b are closed. As illustrated in FIG. 4, the first, second, third, and fourth sets of contacts 70a,b-76a,b include single-pole single-throw switches. However, it should be understood that the sets of contacts 70a,b-76a,b may include single-pole double-throw switches, double-pole single-throw switches, double-pole double-throw switches, etc. if desired.

The first control unit 80 includes a first signal source 91 adapted to generate an electrical signal, e.g., a low voltage and/or low current signal, that is communicated from the first switch assembly 42 to the second switch assembly 44 via the unused third wire pair 29. The first control unit 80 also includes a first sensor 93 adapted to measure an electrical characteristic such as the current, voltage, resistance, etc. associated with the third wire pair 29.

As illustrated in FIG. 4, the fifth transmission line 29a and the sixth transmission line 29b of the third wire pair 29 are connected in loop form. Preferably, the first sensor 93 is a current sensor adapted to measure current flow through a first resistor (not shown) coupled to the loop-connected third wire pair 29. However, any suitable technique may be used for measuring the electrical characteristic associated with the third wire pair 29.

The first control unit 80 further includes a first comparator 92 having an input coupled to the first sensor 93, and operable to receive the measured electrical characteristic, e.g., current, associated with the loop-connected third wire pair 29 from the first sensor 93. The first comparator 92 compares the measured electrical characteristic associated with the loop-connected third wire pair 29 to a predetermined, normal operational value. Alternatively, the measured electrical characteristic may be compared to a range of predetermined, normal operational values. Because an unusual signal path develops in the loop-connected third wire pair 29 in the event of a fault condition associated with the communication bus 24 (e.g., when the communication bus 24 becomes unplugged from the second switch assembly 44), the measured electrical characteristic associated with the third wire pair 29 may drastically change from the predetermined, normal operational value to a reduced or increased value.

As an example, if the cable of the communication bus 24 is pulled from the second switch assembly 44, or a connector 6 associated with the second switch assembly 44, the current flowing along the third wire pair 29 may drop to a reduced value, perhaps approaching zero, due to the incomplete current path that develops in the loop-connected third wire pair 29 as a result of the open circuit condition.

The first control unit 80 further includes a first transistor 90, e.g., a field-effect transistor (FET), connected to the output of the first comparator 92 and the parallel-connected first and second coils 60, 62. Under normal operating conditions, the output of the first comparator 92 is in an active state, thus causing the first transistor 90 to be biased in an "on" state in which the first transistor 90 is conducting. Specifically, in the "on" state, the first transistor 90 provides driving current to the first and second coils 60, 62, thus energizing the first and second coils 60, 62. The resultant magnetic field of the energized first coil 60 produces a force that causes the first set of contacts 70a, 70b to close, and the resultant magnetic field of the energized second coil 62 produces a force that causes the second set of contacts 72a, 72b to close. In this manner, a continuous electrical path is provided in both the first and second wire pairs 25, 27 so that electrical signals may flow uninterrupted along the first and second wire pairs 25, 27.

Upon the detection of a change (i.e., a reduction or increase) in the measured electrical characteristic associated with the third wire pair 29 from the predetermined, normal operational value (or range of predetermined, normal operational values), which may be indicative of a fault condition of the communication bus 24, the output of the first comparator 92 changes to an inactive state, thus turning "off" the first transistor 90. In the "off" state, the first transistor 90 is no longer conducting current to the first and second coils 60, 62. When current ceases to flow in the first coil 60, the first set of contacts 70a, 70b open substantially immediately to interrupt the flow of electrical signals in the first wire pair 25. Similarly, when current ceases to flow in the second coil 62, the second set of contacts 72a, 72b open substantially immediately to interrupt the flow of electrical signals in the second wire pair 27. As a result, any sparking or arcing that could ignite combustible material in the surrounding atmosphere is reduced or prevented.

In a similar manner, the second control unit 82 includes a second signal source 94 adapted to generate an electrical signal, e.g., a low voltage and/or low current signal, that is communicated from the second switch assembly 44 to the first switch assembly 42 via the unused fourth wire pair 37. The second control unit 82 also includes a second sensor 96 adapted to measure an electrical characteristic, e.g., current, voltage, resistance, etc. associated with the fourth wire pair 37.

As illustrated in FIG. 4, the seventh transmission line 37a and the eighth transmission line 37b of the fourth wire pair 37 are connected in loop form. Preferably, the second sensor 96 is a current sensor adapted to measure current flow through a second resistor (not shown) coupled to the loop-connected fourth wire pair 37. However, any suitable technique may be used for measuring the electrical characteristic associated with the fourth wire pair 37.

The second control unit 82 further includes a second comparator 97 having an input coupled to the second sensor 96, and operable to receive the measured electrical characteristic, e.g., current, associated with the fourth wire pair 37 from the second sensor 96. The second comparator 97 compares the measured electrical characteristic associated with the loop-connected fourth wire pair 37 to a predetermined, normal operational value. Alternatively, the measured electrical characteristic may be compared to a range of predetermined, normal operational values. Because an unusual signal path develops in the loop-connected fourth wire pair 37 in the event of a fault condition associated with the communication bus 24 (e.g., when the communication bus 24 becomes unplugged from the first switch assembly 42), the measured electrical characteristic associated with the fourth wire pair 37 may drastically change from the predetermined, normal operational value to a reduced or increased value.

As an example, if the cable of the communication bus 24 is pulled from the first switch assembly 42, or a connector 4 associated with the first switch assembly 42, the current flowing along the fourth wire pair 37 may drop to a reduced value, perhaps approaching zero, due to the incomplete current path that develops in the loop-connected fourth wire pair 37 as a result of the open circuit condition.

The second control unit 82 further includes a second transistor 95, e.g., a field-effect transistor (FET), coupled to the output of the second comparator 97 and the parallel-connected third and fourth coils 64, 66. Under normal operating conditions, the output of the second comparator 97 is in an active state, thus causing the second transistor 95 to be biased in an "on" state in which the second transistor 95 is conducting. Specifically, in the "on" state, the second transistor 95 provides driving current to the third and fourth coils 64, 66, thus energizing the third and fourth coils 64, 66. The resultant magnetic field of the energized third coil 64 produces a force that causes the third set of contacts 74a, 74b to close, and the resultant magnetic field of the energized fourth coil 66 produces a force that causes the fourth set of contacts 76a, 76b to close. In this manner, a continuous electrical path is provided in both the first and second wire pairs 25, 27 so that electrical signals may flow uninterrupted along the first and second wire pairs 25, 27.

Upon the detection of a change (i.e., a reduction or increase) in the measured electrical characteristic associated with the fourth wire pair 37 from the predetermined, normal operational value (or range of predetermined, normal operational values), which may be indicative of a fault condition of the communication bus 24, the output of the second comparator 97 changes to an inactive state, thus turning "off" the second transistor 95. In the "off" state, the second transistor 95 is no longer conducting current to the third and fourth coils 64, 66. When current ceases to flow in the third coil 64, the third set of contacts 74a, 74b open substantially immediately to interrupt the flow of electrical signals in the first wire pair 25. Similarly, when current ceases to flow in the fourth coil 66, the fourth set of contacts 76a, 76b open substantially immediately to interrupt the flow of electrical signals in the second wire pair 27. As a result, any sparking or arcing that could ignite combustible material in the surrounding atmosphere is reduced or prevented.

The types of detected fault conditions may include an open circuit and/or an electrical discontinuity caused by, for example, an improperly installed communication bus 24, the communication bus 24 becoming unplugged from the first switch assembly 42 and/or the second switch assembly 44, the communication bus 24 having poor connector attachments, a cut, severed, and/or otherwise damaged communication bus 24, etc. For example, an installer may improperly attach a connector to one or more of the transmission lines 25, 27, 29, 37 when installing the wiring and connectors of the communication bus 24 and/or the plurality of bus segments 24a-d. In addition, after installation, the communication bus 24 and/or one or more of the plurality of bus segments 24a-d may inadvertently become disconnected from the first switch assembly 42 and/or the second switch assembly 44 during operation. Still further, the communication bus 24 may become cut, severed, opened, and/or otherwise damaged resulting in an open circuit or electrical discontinuity. All of these fault conditions may cause arcing, sparks, and/or excessive heat of the communication bus 24 and/or one or more of the plurality of bus segments 24a-d that could potentially ignite the surrounding atmosphere in the hazardous area 43.

In operation, when the first comparator 92 of the first control unit 80 detects a change (e.g., reduction or increase) in the measured electrical characteristic associated with the loop-connected third wire pair 29 from the predetermined, normal operational value (or range of predetermined, normal operational values), the first comparator 92 causes the first transistor 90 to switch "off." When the first transistor 90 switches "off," current in the first and second coils 60, 62 ceases to flow. As a result, the first set of contacts 70a, 70b and the second set of contacts 72a, 72b open substantially simultaneously, thereby bidirectionally interrupting the flow of electrical signals in both the first and second wire pairs 25, 27. Interrupting the flow of electrical signals in both the first and second wire pairs 25, 27 reduces the possibility of the occurrence of a spark or arc that could ignite the flammable atmosphere in the hazardous area 43.

The second switch assembly 44 operates in a similar manner to that of the first switch assembly 42. In particular, when the second comparator 97 of the second control unit 82 detects a change (e.g., reduction or increase) in the measured electrical characteristic associated with the loop-connected fourth wire pair 37 from the predetermined, normal operational value (or range of predetermined, normal operational values), the second comparator 97 causes the second transistor 95 to switch "off." When the second transistor 95 switches "off," current in the third and fourth coils 64, 66 ceases to flow. As a result, the third set of contacts 74a, 74b and the fourth set of contacts 76a, 76b open substantially simultaneously, thereby bidirectionally interrupting the flow of electrical signals in both the first and second wire pairs 25, 27. Interrupting the flow of electrical signals in both the first and second wire pairs 25, 27 reduces the possibility of the occurrence of a spark or arc that could ignite the flammable atmosphere in the hazardous area 43.

It should be understood that both the first and second control units 80, 82 may detect a fault condition associated with the communication bus 24 at the same time, therefore causing the first and second switch assemblies 42, 44 to operate substantially simultaneously to interrupt the flow of electrical signals in the first and second wire pairs 25, 27.

In addition, although the first and second control units 80, 82 use first and second transistors 90, 95 to switch off current to corresponding coils 60-66 in response to a change in the measured electrical characteristic from the predetermined, normal operational value (or range of predetermined, normal operational values), other similar components such as thyristors could be used as well.

Furthermore, while the safety device 40 has been described as employing electromechanical relays 50-56 to interrupt the flow of electrical signals in the first and second wire pairs 25, 27 under fault conditions, reed switches and/or solid state devices, etc. are equally applicable.

Still further, while the communication bus 24 and bus segments 24*a-d* have been described as having a total of eight separate wires, organized into four wire pairs, other configurations are equally applicable. For example, the communication bus 24 and/or bus segments 24*a-d* may include four separate wires. A first wire may communicate signals from the operator workstations 13, 14 and/or the data historian 23 located in the non-hazardous area 31 to the process controller 12 and/or one or more field devices 15-22 located in the hazardous area 43. A second wire may communicate signals from the process controller 12 and/or one or more smart field devices 19-22 located in the hazardous area 43 to the operator workstations 13, 14 and/or the data historian 23 located in the non-hazardous area 31. The remaining third and fourth unused wires may be used to communicate electrical signals generated by the first and second signal sources 91, 94 of the first and second control units 80, 82, respectively. It should also be understood that the safety device 40 may be connected to the communication bus 24, the bus segments 24*a-d*, the analog lines 33-36, the digital bus 38, and/or any other communication medium located in a hazardous area 43.

While the present disclosure has been described with reference to specific examples, which are intended to be illustrative only and not to be limiting of the disclosure, it will be apparent to those of ordinary skill in the art that changes, additions, or deletions may be made to the disclosed embodiments without departing from the spirit and scope of the disclosure.

What is claimed is:

1. A communication bus suitable for use in a hazardous area of a process plant to transmit electrical signals from one process device to a second and different process device disposed within the process plant and to interrupt the transmission of electrical signals in response to the detection of a fault condition in the communication bus, the communication bus comprising:
    a first end to connect to the one process device;
    a second end to connect to the second and different process device;
    a first transmission path between the first end and the second end that communicates electrical signals in a first direction between the first end and the second end;
    a second transmission path between the first end and the second end that communicates electrical signals in a second direction between the first end and the second end; and
    a safety device coupled to each of the first and second transmission paths between the first and second ends, wherein the safety device includes a first control unit to detect a fault condition associated with the communication bus, and wherein the safety device further includes a first switch unit connected to the first and second transmission paths and having a closed position allowing a flow of electrical signals along the first and second transmission paths and an open position preventing the flow of electrical signals along the first and second transmission paths, and wherein the first control unit causes the first switch unit to move to the open position to interrupt the flow of electrical signals between the first and second ends along each of the first and second transmission paths in response to detecting a fault condition in the communication bus at the first control unit, wherein the first control unit does not use the first and second transmission paths to detect the fault condition in the communication bus.

2. The communication bus of claim 1, wherein the detected fault condition associated with the communication bus includes at least one of an open circuit, an electrical discontinuity, a cut in the communication bus, a severed communication bus, and a disconnected end of the communication bus.

3. The communication bus of claim 1, wherein the safety device includes an intrinsically safe housing and the first control unit and the first switch unit are disposed in the intrinsically safe housing.

4. The communication bus of claim 1, wherein the safety device includes an explosion proof housing and the first control unit and the first switch unit are disposed in the explosion proof housing.

5. A communication bus suitable for use in a hazardous area of a process plant to transmit electrical signals from one process device to a second and different process device disposed within the process plant and to interrupt the transmission of electrical signals in response to the detection of a fault condition in the communication bus, the communication bus comprising:
    a first end to connect to the one process device;
    a second end to connect to the second and different process device;
    a first transmission path between the first end and the second end that communicates electrical signals in a first direction between the first end and the second end;
    a second transmission path between the first end and the second end that communicates electrical signals in a second direction between the first end and the second end;
    a safety device coupled to each of the first and second transmission paths between the first and second ends, wherein the safety device includes a first control unit to detect a fault condition associated with the communication bus, and wherein the safety device further includes a first switch unit connected to the first and second transmission paths and having a closed position allowing a flow of electrical signals along the first and second transmission paths and an open position preventing the flow of electrical signals along the first and second transmission paths, and wherein the first control unit causes the first switch unit to move to the open position to interrupt the flow of electrical signals between the first and second ends along each of the first and second transmission paths in response to detecting a fault condition in the communication bus at the first control unit; and
    a third transmission path between the first and second ends and coupled to the safety device, wherein the first control unit is configured to detect the fault condition on the third transmission path and to cause the first switch unit to move to the open position to interrupt the flow of electrical signals between the first and second ends along each of the first and second transmission paths in response to detecting the fault condition on the third transmission path at the first control unit.

6. The communication bus of claim 5, wherein each of the first, second, and third transmission paths includes twisted pair cable or coaxial cable.

7. The communication bus of claim 5, wherein the first control unit includes a first control device coupled to the third transmission path, and wherein the first control device includes a first signal source that generates an electrical signal that is communicated in the first direction along the third transmission path.

8. The communication bus of claim 7, wherein the first control device includes a first sensor that measures an electrical characteristic associated with the third transmission path.

9. The communication bus of claim 8, wherein the measured electrical characteristic associated with the third transmission path is one of current, voltage, and resistance.

10. The communication bus of claim 8, wherein the first control device includes a first comparator that compares the measured electrical characteristic associated with the third transmission path to a normal operational value.

11. The communication bus of claim 10, wherein the first switch unit includes a first switch coupled to the first control device.

12. The communication bus of claim 11, wherein the first switch includes a first relay and a second relay, and wherein each of the first and second relays is coupled to the first control device.

13. The communication bus of claim 12, wherein the first control device energizes and de-energizes coils associated with each of the first and second relays to open and close the first and second relays.

14. The communication bus of claim 12, wherein each of the first and second relays includes contacts that are closed during normal operation.

15. The communication bus of claim 14, wherein the first control device opens the contacts of the first and second relays in response to a change in the measured electrical characteristic associated with the third transmission path from the normal operational value.

16. The communication bus of claim 5, further including a fourth transmission path between the first end and the second end and coupled to the safety device, wherein the safety device comprises:
a first switch assembly coupled to each of the first, second, third and fourth transmission paths proximate the first end of the communication bus and including the first control unit and the first switch unit; and
a second switch assembly coupled to each of the first, second, third and fourth transmission paths proximate the second end of the communication bus, wherein the second switch assembly includes a second control unit configured to detect a fault condition associated with the communication bus on the fourth transmission path, and a second switch unit connected to the first and second transmission paths and having a closed position allowing a flow of electrical signals along the first and second transmission paths and an open position preventing the flow of electrical signals along the first and second transmission paths, wherein the second control unit is configured to cause the second switch unit to move to the open position to interrupt the flow of electrical signals between the first and second ends along each of the first and second transmission paths in response to detecting the fault condition on the fourth transmission path at the second control unit.

17. The communication bus of claim 16, wherein at least one of the first switch assembly and the second switch assembly is housed in a protective enclosure.

18. A safety device adapted for use in a hazardous area of a process plant, the safety device comprising:
a communication bus including a first end to connect to one process device and a second end to connect to a second process device, first, second and third transmission paths disposed between and communicatively connecting the first end and the second end, wherein transmission paths are disposed between the one process device and the second process device disposed at different locations within the process plant and the first and second transmission paths are coupled to communicate electrical signals between the one process device and the second process device;
a first control unit coupled to the third transmission path to detect a fault condition on the third transmission path associated with the communication bus; and
a first switch unit coupled to the first and second transmission paths between the first end and the second end and to the first control unit and having a closed position allowing a flow of electrical signals along the first and second transmission paths and an open position preventing the flow of electrical signals along the first and second transmission paths, wherein the first control unit causes the first switch unit to move to the open position to interrupt the flow of electrical signals along the first and second transmission paths between the first end and the second end in response to detecting the fault condition associated with the communication bus on the third transmission path at the first control unit.

19. The safety device of claim 18, wherein the first control unit includes a sensor to measure an electrical characteristic associated with the third transmission path.

20. The safety device of claim 19, wherein the measured electrical characteristic associated with the third transmission path includes one of current, voltage, and resistance.

21. The safety device of claim 19, wherein the first control unit includes a comparator to compare the measured electrical characteristic associated with the third transmission path to a normal operational value.

22. The safety device of claim 21, wherein the first transmission path communicates electrical signals in a first direction, and the second transmission path communicates electrical signals in a second direction.

23. The safety device of claim 22, wherein the third transmission path communicates electrical signals in the first direction.

24. The safety device of claim 23, wherein each of the first, second, and third transmission paths includes one wire or two wires.

25. The safety device of claim 23, wherein the first control unit includes a first control device coupled to the third transmission path.

26. The safety device of claim 23, comprising:
a fourth transmission path communicating electrical signals in the second direction, wherein the first control unit is coupled to the third transmission path proximate the first end of the communication bus and the first switch unit is coupled to the first and second transmission lines proximate the first end of the communication bus;
a second control unit coupled to the fourth transmission path proximate the second end of the communication bus to detect a fault condition on the fourth transmission path associated with the communication bus; and a second switch unit coupled to the second control unit and to the first and second transmission paths between the first end and the second end proximate the second end, and having a closed position allowing a flow of electrical signals along the first and second transmission paths and an open position preventing the flow of electrical signals along the first and second transmission paths, wherein the second control unit causes the second switch unit to move to the open position to interrupt the flow of electrical signals along the first and second transmission paths between the first end and the second end in response to detecting a fault condition associated with the communication bus on the fourth transmission path at the second control unit.

27. The safety device of claim 25, wherein the first switch unit includes a first switch and a second switch each coupled to the first control device, wherein the first switch is coupled to the first transmission path, and wherein the second switch is coupled to the second transmission path.

28. The safety device of claim 27, wherein each of the first and second switches includes contacts that are closed during normal operation.

29. The safety device of claim 28, wherein the first control device operates to open the contacts of the first and second switches in response to a change in the measured electrical characteristic associated with the third transmission path from the normal operational value.

30. The safety device of claim 18, wherein each of the transmission paths includes a twisted pair cable or a coaxial cable.

31. The safety device of claim 18, wherein the first and second transmission paths communicate electrical signals using a communication protocol based on Ethernet, Fieldbus, HART, PROFIBUS, WORLDFIP, Device-Net, As-Interface, or CAN.

32. The safety device of claim 18, wherein the first control unit includes a signal source that operates to generate an electrical signal that is communicated along the third transmission path.

33. A method for providing a communication bus suitable for use in a hazardous area of a process plant, the method comprising:

communicating electrical signals from a first process device to a second process device by communicating the electrical signals from a first end of the communication bus to a second end of the communication bus along a first transmission path and a second transmission path disposed between and communicatively connecting the first end and the second end of the communication bus;

communicating electrical signals along a third transmission path within the communication bus;

measuring an electrical characteristic associated with the third transmission path;

detecting a fault condition associated with the communication bus in response to the measured electrical characteristic associated with the third transmission path; and interrupting the flow of electrical signals along the first and second transmission paths at a point between the first end and the second end of the communication bus in response to detecting a fault condition associated with the communication bus on the third transmission path.

34. The method of claim 33, wherein detecting the fault condition associated with the communication bus includes detecting at least one of an open circuit, an electrical discontinuity, a cut in the communication bus, a severed communication bus, and a disconnected end of the communication bus.

35. The method of claim 33, wherein communicating electrical signals along the first and second transmission paths includes communicating electrical signals in a first direction along a first pair of transmission wires of the first transmission path and communicating electrical signals in a second direction along a second pair of transmission wires of the second transmission path, and wherein communicating electrical signals along the third transmission path includes communicating electrical signals in the first direction along a third pair of transmission wires of the third transmission path, wherein the fault condition is detected on the third pair of transmission wires.

36. The method of claim 33, wherein communicating electrical signals along the first and second transmission paths includes communicating electrical signals in a first direction along a first transmission wire of the first transmission path and communicating electrical signals in a second direction along a second transmission wire of the second transmission path, and wherein communicating electrical signals along the third transmission path includes communicating electrical signals in the first direction along a third transmission wire of the third transmission path, wherein the fault condition is detected on the third transmission wire.

37. The method of claim 33, wherein measuring the electrical characteristic associated with the third transmission path includes measuring current, voltage, or resistance.

38. The method of claim 33, further including comparing the measured electrical characteristic associated with the third transmission path to a normal operational value.

39. The method of claim 38, wherein interrupting the flow of electrical signals along the first and second transmission paths includes opening switch contacts coupled to the first and second transmission paths in response to a change in the measured electrical characteristic associated with the third transmission path from the normal operational value.

40. A communication bus suitable for use in a hazardous area of a process plant to transmit electrical signals from one process device to a second and different process device disposed within the process plant and to interrupt the transmission of electrical signals in response to the detection of a fault condition in the communication bus, the communication bus comprising:

a first end to connect to the one process device;

a second end to connect to the second and different process device;

a first transmission path between the first end and the second end that communicates electrical signals in a first direction between the first end and the second end;

a second transmission path between the first end and the second end that communicates electrical signals in a second direction between the first end and the second end;

a safety device coupled to each of the first and second transmission paths between the first and second ends, wherein the safety device includes a first control unit to detect a fault condition associated with the communication bus, and wherein the safety device further includes a first switch unit connected to the first and second transmission paths and having a closed position allowing a flow of electrical signals along the first and second transmission paths and an open position preventing the flow of electrical signals along the first and second transmission paths, and wherein the first control unit causes the first switch unit to move to the open position to interrupt the flow of electrical signals between the first and second ends along each of the first and second transmission paths in response to detecting a fault condition in the communication bus at the first control unit; and a third transmission path and a fourth transmission path connected in a loop within the communication bus, wherein the safety device is coupled to each of the third and fourth transmission paths and wherein the control unit includes a signal source to send a generated signal through the third transmission path and receives a received signal on the fourth transmission path and detects a fault condition based on the received signal.

* * * * *